C. ASSMANN.
REGULATING APPARATUS FOR MIXING VALVES.
APPLICATION FILED NOV. 29, 1907.

962,111. Patented June 21, 1910.

Witnesses:
Georg Taube
Edmund Steil

Inventor
Carl Assmann

UNITED STATES PATENT OFFICE.

CARL ASSMANN, OF CHARLOTTENBURG, GERMANY.

REGULATING APPARATUS FOR MIXING-VALVES.

962,111.  Specification of Letters Patent.  Patented June 21, 1910.

Application filed November 29, 1907. Serial No. 404,391.

*To all whom it may concern:*

Be it known that I, CARL ASSMANN, a subject of the King of Prussia, residing at No. 183 Uhland street, Charlottenburg, in Germany, have invented a new and useful Improvement in Regulating Apparatus for Mixing-Valves, of which the following is a specification.

This invention relates to mixing-valves which are largely used in chemical laboratories or work and in bath installations, particularly in shower-baths, for the purpose of mixing cold and hot water, and the object of the invention is to overcome the drawback existing in such appliances which consists in a simultaneous change of the ratio or relative quantities of the liquids to be mixed and consequently of the temperature of the mixture in accordance with the variation of the pressure conditions in the supply conduits of pipes, although the position of the valve remains unaltered. With the usual method of carrying out bath installations, however, considerable fluctuations in pressure are unavoidable. This defect is obviated by inserting an automatic regulating device in the conduits before the mixing valve, and by so arranging the said regulator and combining it with the mixing valve that it acts on the liquids in such a manner that both liquids enter the mixing valve with equal pressure, the higher pressure of the one liquid being automatically reduced to that of the other liquid, before admission to the mixing valve. For this operation the proportion of the mixed liquids will remain constant so long as the respective position of the mixing valve is maintained, independently of whatever may be changes of pressure in the supply conduits. This object is attained by means of a regulating appliance attached or connected to the mixing valve on the inlet side, which regulator automatically throttles the liquid at higher pressure for the time being, thus reducing its pressure to that of the other liquid at lower pressure, the higher pressure displacing a distributing slide of the regulating device in a convenient direction for partially shutting off the respective passage.

Two constructional forms of the regulating device according to this invention are illustrated in the accompanying drawing, which forms a part of this specification.

Figure 1:
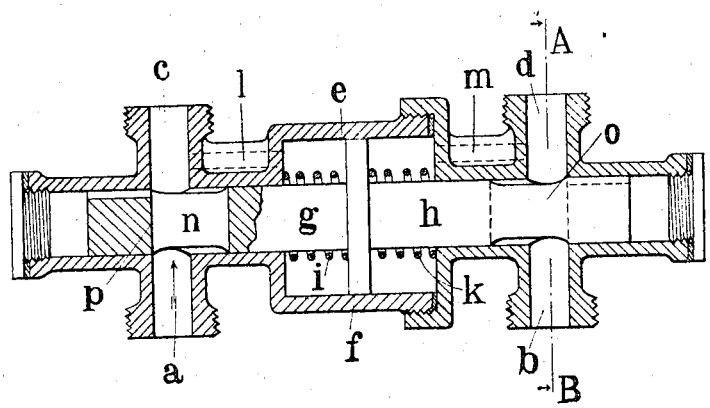
Figure 2:
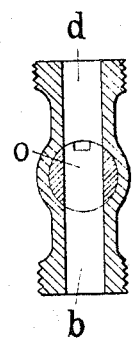
Figure 3:
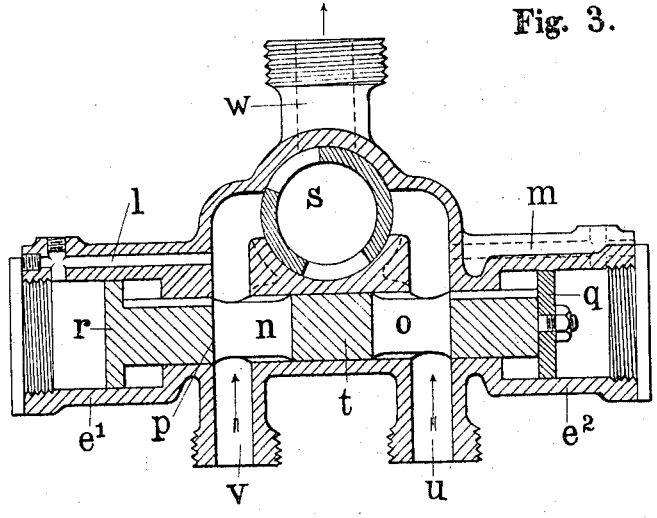

Figure 1 is a longitudinal sectional view and Fig. 2 is a cross section on the line A—B of Fig. 1, representing the regulating device. Fig. 3 is a longitudinal sectional elevation of another form of the regulating device combined with a mixing valve.

Similar reference characters denote similar or equivalent parts throughout the several views of the drawing.

Referring to Figs. 1 and 2, $a$ and $b$ designate the inlet-ports or admission tubes for the two liquids to be mixed and having different temperatures. In the widened cylindrical portion $e$ of the barrel or casing of the regulating device, a piston $f$ is axially displaceable, which piston is integral with or connected to two plungers or cylindric slides $g$ and $h$ on its two sides respectively, the said slides being longitudinally movable in corresponding bores or openings of two extensions of the barrel which are closed at either end in any suitable manner. Springs $i$ and $k$ maintain the piston $f$ in its middle position as long as no other forces are operating on the same, and tend to reconduct the displaced piston to the said position. The one end of the cylinder $e$, on its left hand side, is in open communication with the outlet pipe $c$ by means of a by-pass $l$, while its opposite end communicates in the same manner with the outlet pipe $d$ through the channel $m$. In the slides $g$ and $h$ are provided slots or passages $n$ and $o$ respectively, enabling the open connection between the ports $a$ and $c$, and $b$ and $d$ respectively. To the admission pipes $a$ and $b$ the conduits conveying the hot and cold water to the regulating device, are attached in the usual way, while the discharge pipes $c$ and $d$ are to be joined to the respective inlet ports of a mixing valve of any convenient or well known construction.

The regulating appliance operates as follows: Suppose the liquid pressures were uniform in either conduit. The distributing slide $f, g, h$ remains in repose when the mixing valve is started. However, if the pressure is higher or increases in one of the conduits, for example, on the left hand side, the excess of pressure acts upon the left side of the piston $f$ through the by-pass $l$, thereby displacing the entire distributing slide to the right hand, so that the edge $p$ of the slot $n$ comes in front of, and partially closes the passage from the admission port $a$ to the discharge port $c$, thus producing throttling of the liquid flowing through the said passage, and gradually reducing the pressure of the same to the amount of pressure present on the other side, when the distributing slide will come to rest.

In the device represented in Fig. 3 the mixing device is arranged in the barrel of the regulator; it may be a three way cock $s$, as shown, which allows to vary the exhaust of the hot and cold water through the discharge pipe $w$, mixed in any desired proportion. Two pistons $r$ and $q$ rigidly connected with one another by the distributing slide $t$, move in separate cylinders $e^1$ and $e^2$ respectively. The passages from the inlet ports $v$ and $u$ to the mixing valve $s$ are controlled by slots $n$ and $o$ respectively, formed in the slide $t$ on convenient places. This construction operates in the same manner as described above in connection with Figs. 1 and 2, with the difference however that the hot and cold liquids act upon the ends of the distributing slide $q$, $t$, $r$ through the by-passes $l$ and $m$ respectively.

Instead of the piston or pistons above referred to, a flexible diaphragm or diaphragms may be employed, as may be easily understood and is well known in the art, so that illustration may be dispensed with.

The springs $i$ and $k$ are not indispensable in all constructions, their main object being to cushion the movement of the distributing slide.

I have shown several constructions of my invention for the purpose of examples, but it is obvious that the disposition of the parts may be modified in different ways without departing from the principle of my invention. I, therefore, do not wish to be limited to those constructions, but What I broadly claim as my invention, and desire to secure by Letters Patent, is—

1. A regulating device for liquid-mixing valves, comprising a casing having passages for two liquids, means for automatically restricting either passage without affecting the other passage, and means whereby the fluid pressures in said passages are exerted oppositely on the said restricted means for the passages.

2. A regulating device for liquid mixing valves, comprising a casing having two liquid passages, and common controlling means for said passages movable in opposite directions and adapted to automatically restrict either passage under the actuating influence of an excess of pressure in either passage, the restriction of one passage being accomplished without affecting the other passage, and the arrangement being such that the fluid pressures in said passages act oppositely upon said controlling means.

3. A regulating device for liquid-mixing valves, comprising a casing having two liquid-passages, each passage having an inlet branch and an outlet branch, and a plunger-rod intersecting the inlet and outlet branches and adapted to control the flow of liquid through each passage, the restriction of the flow through one passage being accomplished without affecting the flow through the other passage, and means whereby the fluid-pressures in said passages act oppositely on said plunger-rod and form the actuating means therefor.

4. A regulating device for liquid-mixing valves, comprising a casing having two liquid passages, each passage having an inlet branch and an outlet branch, and a plunger-rod chamber with which the inlet and outlet branches connect, a plunger-rod mounted to move in said chamber and adapted to restrict the openings of the inlet and outlet branches into the plunger-rod chamber, and means whereby the fluid pressures in said passages operate oppositely on said plunger-rod and form the actuating means therefor.

5. The combination with a mixing valve of a regulating valve, comprising a cylinder, a piston movable therein, a distributing slide connected with the said piston and provided with slots, the cylinder being provided with separate inlet- and discharge-ports for the liquids to be mixed, the passages from the inlet to the outlet ports being controlled by the slide and the slots therein, and channels connecting the said passages with the ends of the cylinder.

6. The combination with a mixing valve of a regulating device, comprising a barrel, two passages formed therein, a distributing slide movable in the barrel by the pressure of the liquids flowing through said passages, operating faces provided on the slide on which the liquids to be mixed are adapted to act in opposite directions, the slide having slots and the slide and slots being adapted to control the said passages.

7. The combination with a valve capable of mixing two liquids at different temperatures, of a regulating device, comprising a barrel, two passages for the liquids, formed therein, a distributing slide movable in the barrel and adapted to control the said passages, and operating faces provided on the slide and arranged in such a manner that they are adapted to receive the pressures of the liquids in opposite directions, said slide changing the pressure of one liquid without affecting that of the other.

8. The combination with a valve for mixing two liquids at different temperatures, of a regulating device, comprising a casing, two passages formed therein, a distributing slide movable in the casing and capable of controlling the said passages, operating faces provided on the said slide for receiving the pressures of the liquids in opposite directions, and by-passes for conveying the liquid pressures to the said operating forces to control the position of the slide.

9. The combination with a valve for mixing two liquids at different temperatures, of a regulating device, comprising a casing, two passages formed therein, a distributing slide movable in the casing and capable of controlling the said passages, operating faces provided on the slide and receiving the pressures of the liquids in opposite directions, by-passes for conveying the liquid pressures to the said operating faces to control the position of the slide, and a yielding device capable of returning the slide to its normal position.

10. A regulating device for liquid valves, comprising a casing having two separate liquid passages, and a plunger-rod intersecting the passages intermediate their inlet and outlet orifices and adapted to establish and control the flow of fluid through the inlet and outlet portions of each passage, the plunger-rod being subjected to the pressure in each passage and the preponderating pressure moving the piston to restrict the corresponding passage.

11. A regulating device for liquids comprising a casing having two separate fluid-passages each composed of an inlet branch and an outlet branch, a plunger-rod controlling both passages and subjected to the pressures therein, the plunger-rod establishing and controlling communication between an inlet branch and the corresponding outlet branch, said plunger-rod being given its passage-controlling movement by the difference of pressures of the fluids.

In testimony whereof I have signed my name to this specification in the presence of two subscribing witnesses.

CARL ASSMANN.

Witnesses:
  HENRY HASPER,
  WOLDEMAR HAUPT.